Aug. 30, 1966 L. COOPER ETAL 3,269,254
OPTICAL APPARATUS FOR INDICATING AND MEASURING
THE ROLL ANGULAR ORIENTATION
OF A MOVABLE BODY
Filed Dec. 31, 1962 3 Sheets-Sheet 1

INVENTORS
LAWRENCE COOPER
RICHARD W. KERN
BY
Ralph R Barnard
ATTORNEY

United States Patent Office 3,269,254
Patented August 30, 1966

3,269,254
OPTICAL APPARATUS FOR INDICATING AND MEASURING THE ROLL ANGULAR ORIENTATION OF A MOVABLE BODY
Lawrence Cooper, Endwell, and Richard W. Kern, Vestal, N.Y., assignors to International Business Machines Corporation, New York, N.Y., a corporation of New York
Filed Dec. 31, 1962, Ser. No. 248,393
7 Claims. (Cl. 88—14)

The present invention relates generally to the optical arts and more particularly to apparatus for measuring and/or aligning the angular orientations of spaced physical object or bodies.

The position and orientaiton of any body with respect to a reference body may be defined by three linear coordinates and three angular coordinates corresponding to translation along and rotation about three mutually perpendicular axes. The three angular rotations are commonly referred to as pitch, azimuth and roll.

At various times it is necessary to measure the angular orientations of a body with respect to a reference body. In other instances, such as when aligning output and input shafts in a mechanical drive train, it is necessary to accurately align the angular orientations of one body with respect to another. Many techniques and assemblages of equipment have been proposed to accomplish the above mentioned measuring and/or aligning operations. One scheme involves the use of two normally disposed conventional auto-collimators wherein each of the auto-collimators provides an indication of misalignment about two of the three mutually perpendicular axes. By correlating the information obtained from both auto-collimators it is possible to obtain information concerning the angular orientations of spaced bodies with respect to the three mutually perpendicular axes. However, the apparatus requires a pair of accurate perpendicular reflecting surfaces on one of the bodies and perpendicular mounting surfaces on the other of the bodies. The apparatus is comparatively expensive and does not lend itself to use in appilcations where limited working space is available. Another approach to these problems which represents a significant advance in the art is disclosed and claimed in the copending application of Richard W. Kern, Serial No. 95,898, filed March 15, 1961, entitled ,"Optical Measuring Means," which is assigned to the assignee of the present invention. An optical system of the auto-collimating type and having means to deflect the radiated beam containing optical information through a preselected angle of deviation is provided. The disclosed apparatus is highly simplified and extremely flexible in that all three angular orientations about three mutually perpendicular axes with respect to a reference body are available from the optical information contained on a single measuring recticle. This scheme is somewhat limited in that the relative spacing bewteen the reference body and the body whose angular orientations are to be measured cannot be varied within wide limits since the deflecting means is somewhat dependent upon this relative spacing.

It is a primary object of this invention to provide a new and improved optical system for measuring the angular orientations of a body with respect to a reference body.

It is still another object of the present invention to provide a new and improved optical system for measuring the angular orientations of a body with respect to a reference body about three mutually perpendicular axes.

It is still another object of the present invention to provide a new and improved optical system for measuring the angular orientations of a body with respect to a reference body about three mutually perpendicular axes using a single optical collimating system.

It is another object of the present invention to provide a new and improved optical system for aligning at least two spaced bodies about three mutually perpendicular axes.

It is still another object of the present invention to provide a new and improved optical system for synchronizing or aligning two spaced shafts utilizing a single auto-collimator system.

The objects of the present invention are provided by modifying the prior art optical auto-collimator or collimator systems to utilize an optical grating mounted on the body for which the angular orientation is to be measured and/or aligned. The optical grating is constructed to provide a light diffraction pattern by reason of parallel opaque lines alternating with either parallel mirror or parallel transparent portions.

The foregoing and other objects, features and advantages of the invention will be apparent from the following more particular description of preferred embodiments of the invention as illustrated in the accompanying drawings.

Figure 1:
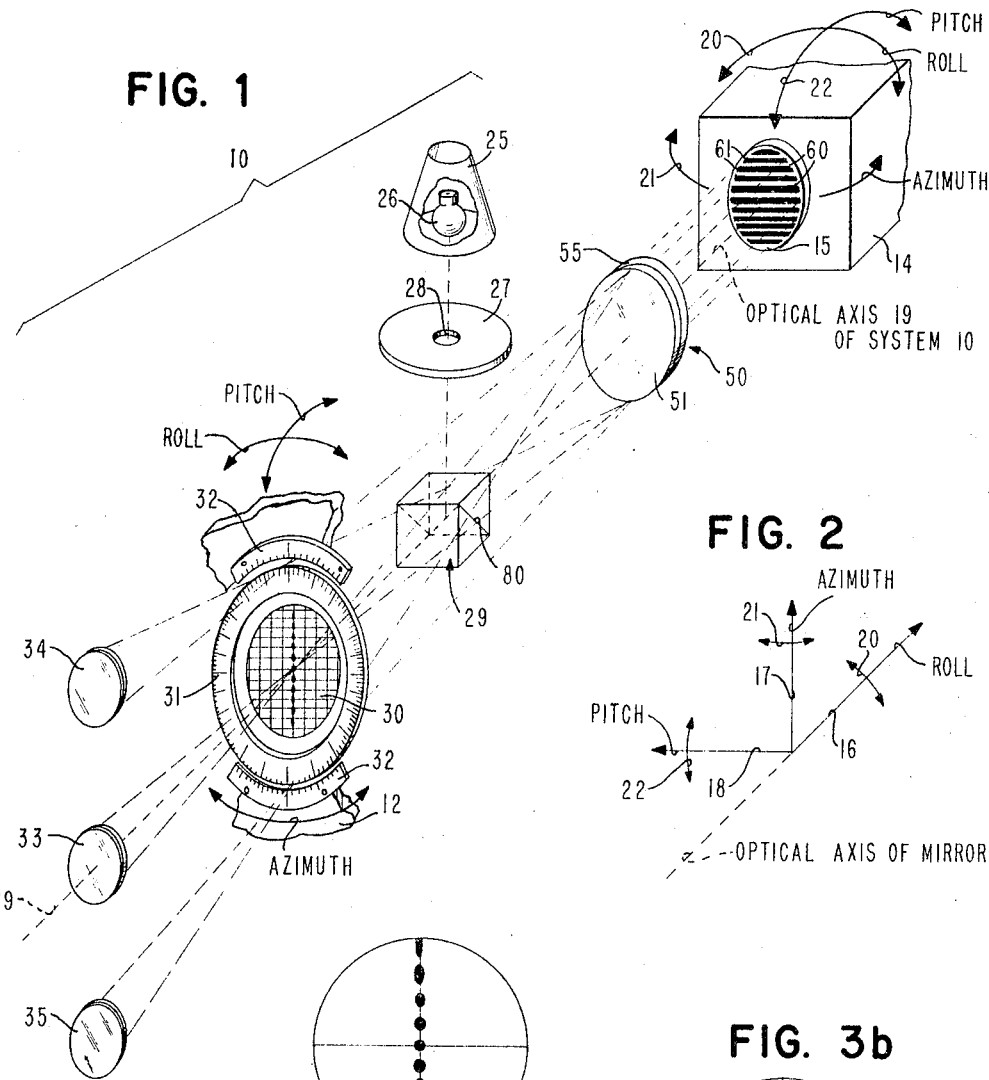
FIGURE 1 is a simplified three-dimensional view of one embodiment of an optical measuring and/or alignmen system constructed in accordance with the teachings of the present invention.
Figure 4:
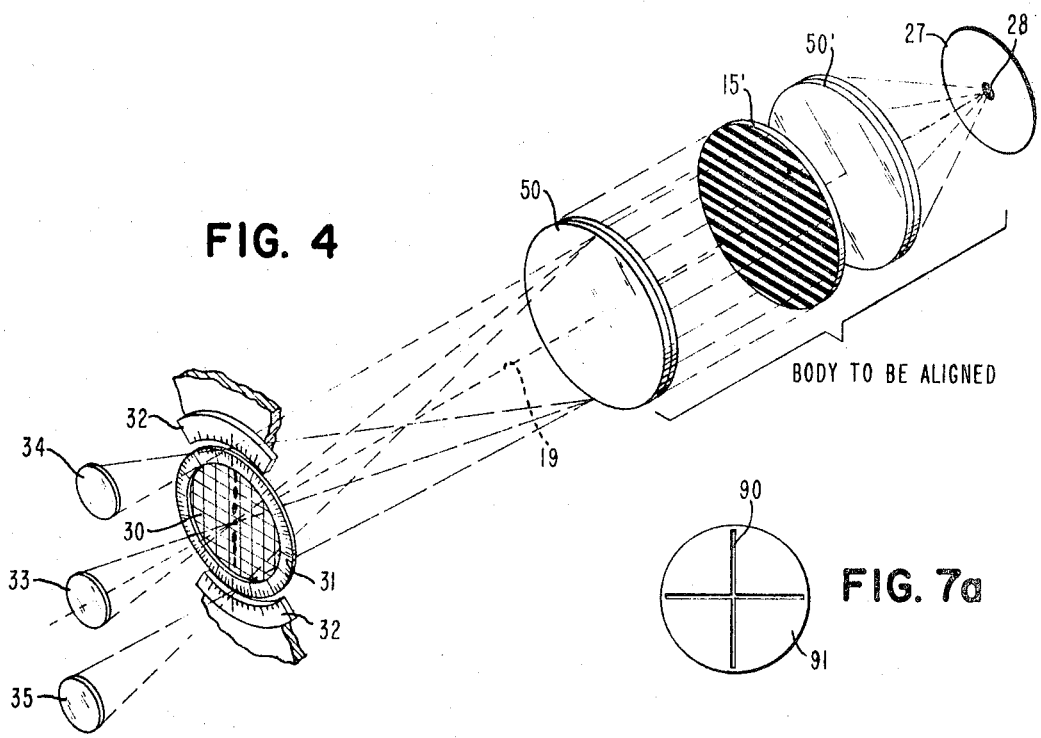
Figure 5:
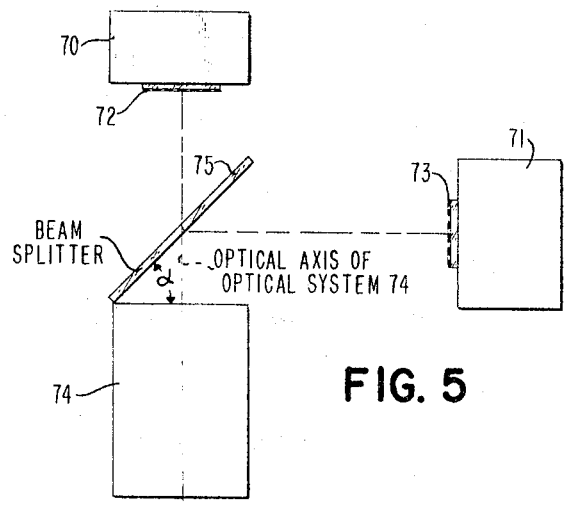
Figure 6:
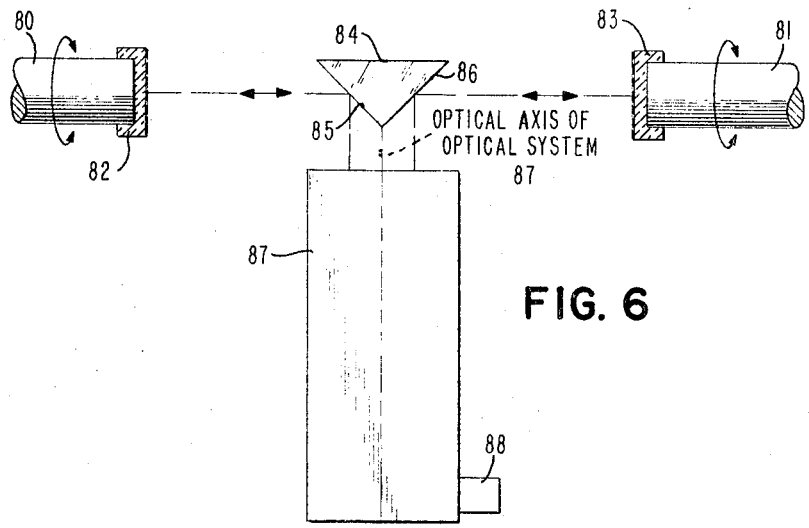

FIGURES 3a, 3b, 3c, and 3d show the image present in the image measuring reticle of the optical system of FIGURE 1 for various angular orientations of the mirror 15 of FIGURE 1 in accordance with the teachings of the present invention;

FIGURE 4 is a simplified three-dimensional view of another embodiment of an optical measuring and/or alignment system constructed in accordance with the teachings of the present invention wherein a collimating lens system is used in place of an auto-collimating system;

FIGURE 5 is a simplified view of another embodiment of an optical measuring and/or alignment system constructed in accordance with the teachings of the present invention wherein a single auto-collimater can be used for aligning one body with respect to another body;

FIGURE 6 is a simplified view of still another embodiment of the teachings of the present invention wherein an auto-collimator system can be used for the purpose of measuring the synchronization of two rotating or rotatable shafts; and FIGURES 7a–7g show the image present in the image measuring reticle such as that shown in FIGURE 1 for various angular orientations of mirror 15 when the point light source is modified to comprise a dark field reticle with mutually perpendicular bisecting narrow transparent slits.

Referring now to the drawings, and initially to FIGURE 1 thereof, there is shown a first embodiment of an optical measuring and alignment system constructed in accordance with and employing the teachings of this invention. The reference numeral 10 designates generally an auto-collimator which is rigidly mounted by means, not shown. A body 14 having a mirrored 15 is supported in space by suitable means, not shown, in front of the main portion 10 of the optical system. It is the function of the optical measuring and alignment system to provide an indication of the relative angular orientations between the optical system 10 and the mirror 15 attached to body 14 with respect to three mutually perpendicular axes.

Figure 2:
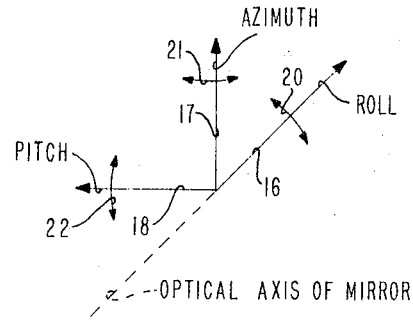
FIGURE 2 is a schematic perspective view illustrating and defining the angular orientations or coordinates of pitch, azimuth and roll.

In FIGURE 2 of the drawings, there is shown three mutually perpendicular axes 16, 17 and 18 which may be considered as the body axes of the mirror 15 mounted on body 14. Except for the misalignments being measured, the axis 16 of mirror 15 extends in super-imposed relation with respect to optical axis 19 of the optical measuring and alignment system. By definition, an angular rotation in either direction about or in a plane normal to axis 16 as indicated by arrow 20 is roll. Movements about the axes 17 and 18 as indicated by arrows 21 and 22, respectively, are defined as angular rotations in azimuth and pitch. The rotative positions of any body can be defined in terms of azimuth, pitch and roll coordinates with respect to the three mutually perpendicular axes 16, 17 and 18. A conventional auto-collimator is operative to provide information concerning only the azimuth and pitch angular coordinates or orientations between two spaced physical objects as is well known in the art. The measuring and/or alignment systems herein disclosed provides information concerning all three angular coordinates or orientations by producing and displaying a diffraction pattern in combination with the usual reflected or transmitted collimated optical information available from an auto-collimating or collimating optical alignment system. The main portion of the optical system 10 comprises a lamp housing and reflecting structure 25 in which is mounted a source of illumination, such as electric lamp 26 that is connected to a suitable source of electrical power, not shown. Disposed below the lamp housing and reflector 25 is a mask 27 having an aperture 28 (dark field reticle) therein.

In practicing the teachings of the present invention, aperture 28 may have several shapes such as a small circular hole shown. The lamp housing 25, electric lamp 26, and mask 27 with a small round aperture 28, provide a well defined and high intensity point light source. As will be described hereinafter with respect to FIGURE 7a, the aperture 28 can be mutually perpendicular bisecting narrow transparent slits.

Mounted below the mask 27 is a beam splitting cube 29 (formed by two prisms) having a partially transparent beam splitting surface 80 disposed at an angle of 45 degrees with respect to the optical axis 19 of the system 10. The arrangement is such that the point source of the light emanating from the mask passes through the beam splitter and approximately half of the light energy is reflected along the optical axis 19 toward the mirror 15 while the remaining light energy passes through the surface 80 and is no longer effective in the optical system 10.

Disposed between the beam splitting prism 29 and the mirror 15 along the optical axis is a collimator lens system 50. As will be recognized by those skilled in the art, the collimator lens system 50 may comprise a doublet defined by concave lens 51 and a convex lens 55. This lens system 50 receives the light passing along the optical axis 19 from the beam splitting prism and provides a collimated beam output.

The collimating lens system 50 is located at a distance from beam splitting cube 29 such that the total distance along the optical path between the point source formed by aperture 28 is equal to the focal length of the collimating lens 50. As a result, the total cone of light from aperture 28 passes through the collimating lens and the collimated beam contains the full field of information from the point source. The collimated beam of light would then theoretically form an image of the point source at infinity since it theoretically renders all of the light rays parallel. However, this collimated beam is directed along the optical axis 19 over a relatively small finite distance to the mirror 15.

Assuming, in accordance with the prior art, mirror 15 is a total mirrored surface, the reflected parallel light would then pass back through the collimating lens system 50. If the mirror 15 were oriented to be completely parallel with the collimating lens 50 and perpendicular to optical axis 19 all of the reflected light waves would register with the collimating lens and re-enter the beam splitting cube 29 where half of the light energy would pass on to an image measuring reticle 30. If the image measuring reticle 30 is perpendicular to the optical axis 19 and positioned therealong such that the distance between measuring reticle 30 and the lens 50 is equal to the focal length of the lens, the point source would be imaged at the intersection of optical axis 19 and the measuring reticle 30. The image on measuring reticle 30 may be viewed via ocular lens 33 located along the axis 19 at distance equal to its focal length. The ocular lens 33, measuring reticle 30 and lens 50 comprise what may be called a telescope.

On the other hand, if the mirror 15 was not completely perpendicular to optical axis 19, but was misaligned in azimuth, the parallel reflected light passing through the collimating lens 50 would be reduced in intensity and the image of the point source formed at the measuring reticle would be shifted in a direction indicated by the arrows labeled Azimuth in either one of the two possible directions based upon the direction of the azimuth misalignment of mirror 15. Similarly, if the mirror 15 is misaligned and not perpendicular to optical axis 19 because of a non-alignment in pitch orientation, the image point source in measuring reticle 30 would move in the direction indicated by the arrows labeled Pitch. Of course, if the mirror 15 is misaligned in both an azimuth and pitch angle, the image point source will move along both the pitch and azimuth coordinates of reticle 30 in an amount and direction commensurate with the misorientation in both azimuth and pitch.

Accordingly, as thus far described, FIGURE 1 operates in the same manner as the prior art. The alignment of mirror 15, with respect to optical axis 19 can be readily measured for angular misalignments about two angular coordinates azimuth and pitch. However, no means is provided for obtaining information at the same time about the alignment of mirror 15, about the other body axis 16, known as roll. Roll body axis 16 should coincide with an extension of optical axis 19 when either the optical system 10 or the mirror 15 is adjusted in pitch and roll to bring the image point source into the center of measuring reticle 30. To provide information as to the angular orientation of mirror 15 about optical axis 19, it is a fundamental teaching of the present invention that mirror 15 may be modified so that it contains parallel alternately spaced reflecting and non-reflecting areas such as shown in FIGURE 1. As shown, the opaque lines are identified by portions 61 and the reflecting lines are identified by the portions 60. To those skilled in the art, the placing of such alternate opaque lines on the reflecting mirror is known as utilizing Ronchi Rulings. As is theorized in the prior art, such a modified mirror may be considered as plural apparent light sources when it is reflecting a light beam having parallel light rays.

The plural apparent light sources result in light diffraction and, according to the teachings of the present invention, such a diffracting mirror or optical grating may be used to great advantage in the measuring and aligning environment of FIGURE 1 in that it causes plural image point sources to be present in the measuring reticle 30. Moreover, these plural image point sources present in the measuring reticle 30 form a straight line with the image point sources on both sides of the primary image point source representing progressively higher order lower intensity secondary images. The line formed by the plural image point sources in the reticle is always perpendicular to the opaque or Ronchi Rulings in the mirror. If the mirror 15 is aligned in azimuth and pitch with respect to the optical axis 19, the primary image point source in measuring reticle 30 will be the center of the reticle and the line formed by the secondary image point source forms a vertical line which is perpendicular to the horizontal Ronchi Rulings shown on mirror 15. Accordingly, if mirror 15 remained in alignment with the optical system represented by optical axis 19 in pitch and azimuth but was rotated about its roll axis 16 which corresponds to an extension of optical axis 19, the line formed by the primary and secondary image point sources in the measuring reticle 30 would merely rotate. Moreover, as shown, any given rotation of the line formed by the image point sources may be measured by moving a circular scale 31 with respect to index scales 32 and viewed via either ocular lens 34 or lens 35. As those skilled in the art will recognize, the calibration on both the index scales 32 and the rotatable scale 31 provides for direct reading and interpolation.

Figure 3A:
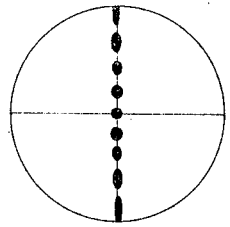
Figure 3B:
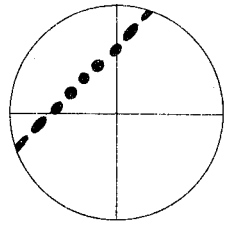
Figure 3C:
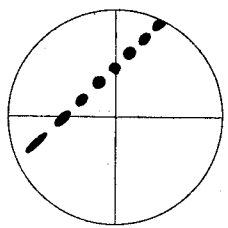
Figure 3D:
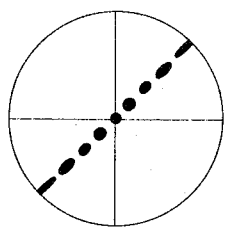

Reference may be made to the views set forth in FIGURES 3a–3d which are representative of various image point source displays which may be seen in the measuring reticle (via an ocular lens) for various orientations of the diffracting mirror 15 with respect to the optical system 10 of FIGURE 1. The coordinate lines on reticle 30 are not shown in FIGURES 3a–3d in order to simplify the display. FIGURE 3a shows the image point source display in the measuring rectile 30 when the pitch and azimuth of mirror 15 is such that the plane of that mirror is perpendicular to an extension of optical axis 19 and the diffracting opaque lines are horizontal as shown in FIGURE 1. FIGURE 3b shows the image point sources display according to the teachings of the present invention when the diffracting mirror 15 is oriented with respect to the optical system 10 represented by optical axis 19 in a manner such that the plane of the mirror is pitched UP and is oriented in azimuth to the left. In addition, since the mirror is rotated clockwise, the line of primary and secondary image point sources will appear to have a slope as shown in FIGURE 3b. On the other hand, when the plane of the mirror grating is merely pitched UP and rotated slightly clockwise from horizontal, as shown in FIGURE 1, but is in alignment with respect to azimuth the line formed by the primary and secondary image point source may look like that shown in FIGURE 3c. Finally, if the mirror grating 15 is in alignment with the optical system 10 represented by optical axis 19 with respect to azimuth and pitch but rotated slightly clockwise with respect to the position shown in FIGURE 1, the line of primary and secondary image point sources which appears in the measuring reticle 30 will appear as that shown in FIGURE 3d.

During a measuring or alignment operation as described hereinabove with respect to FIGURE 1, the measuring reticle 30, its mounting and ocular lens 33, 34 and 35 may be moved together in the directions of the arrows shown for Azimuth and Pitch by a measured amount to bring the line of primary and secondary (higher order) images through the center of the measuring reticle.

Accordingly, following the teachings of the present invention, the optical system forming an auto-collimator shown in block 10 of FIGURE 1 may be used to measure and/or align the mirror grating 15 fixedly attached to body 14 with respect to any of the three angular rotatable coordinated pitch, roll and azimuth. Such a functional operation of an auto-collimator is not possible without utilizing the teachings of the present invention.

The image measuring reticle 30 may be viewed by the human eye via an amplifying lens system as required by the practical application. For example, ocular lens 33 may be used to view the primary image point source as shown in FIGURE 1. Similarly, additional ocular lens 34 and 35 may be utilized to view the periphery of the measuring reticle with respect to the line formed by the primary and secondary image point sources. The use of two calibrated indices 32 at diametrical positions as shown would allow for taking a reading on each periphery and averaging them with respect to the roll orientation of the mirror grating 15 to correct for any eccentricities in the image display system of the auto-collimator 10.

Referring to FIGURE 4, there is shown a simplified three-dimensional view of another embodiment of an optical measuring and/or alignment system constructed in accordance with the teachings of the present invention, which in many respects is identical to that shown in FIGURE 1. Identical reference numerals are utilized to identify identical functional elements. Inasmuch as image reflections were utilized in the alignment of the optical system 10 of FIGURE 1, it may be categorized broadly as an auto-collimator. It should be understood, however, that because of the breadth of the teachings of the present invention they may be included in other alignment systems utilizing a collimator which does not depend upon reflected light. As an illustration, FIGURE 4 is a modification of FIGURE 1 wherein the point source and diffracting grating are both placed upon the body having an angular orientation to be measured or aligned. In such an embodiment there is, of course, no requirement for a beam splitting cube. However, there is a requirement for placing a second collimating lens 50' between the point source of light (aperture 28) and the optical grating 15'. The optical grating 15' is not a mirror but a plate of alternate transparent and opaque parallel lines or portions for creating the diffraction pattern derived by the mirror grating 15 of FIGURE 1. It is emphasized that in this embodiment, grating 15', collimating lens 50' and the point light source (aperture 28) are fixedly attached to the same body which is to be aligned or its alignment measured. The operation of the optical measuring and alignment system of FIGURE 4 is in other respects identical with that shown and described hereinabove with respect to FIGURE 1.

The teachings of the present invention provide for great versatility in the measuring and/or alignment of bodies with respect to all three of the mutually perpendicular angular coordinates.

FIGURE 5 shows how the teachings of the present invention may be used in aligning one body with respect to another body using a single auto-collimator. Specifically, with reference to FIGURE 5, there is shown a body 70 and a body 71 with respect to which, the relatively angular orientation is to be measured and/or aligned in all three angular degrees of freedom. Mounted on each of the bodies is shown a mirror having thereon a grating of alternate transparent and opaque parallel lines. Mirror grating 72 is mounted on body 70, mirror grating 73 is mounted on body 71. It should be understood that it is the axis system of mirrors 72 and 73 which are either measured or aligned and it is assumed, for purposes of the teachings of the present invention, that the axis system of the mirror and the corresponding body on which it is mounted are one and the same. This may not be true in a practical application and consideration must be made for this fact when such is not the case.

For purposes of illustration, block 74 may be considered to contain at least all of the components shown as an auto-collimator 10 in FIGURE 1. Accordingly, there would be contained therein a collimating lens, a light source with a round aperture in a direct field reticle for providing a point source of light, a beam splitting cube for supplying a cone of light to a collimating lens from the point source, an image measuring reticle and at least one ocular lens for viewing the image formed on the measuring reticle. As set forth hereinabove, the ocular lens, the image measuring reticle and the collimating lens may be considered to form a viewing telescope. In order for the single auto-collimator 74 to optically cooperate with the two mirror gratings 72 and 73, there is inserted in the optical path of the auto-collimator a beam splitter 75, the plane of which forms an angle α from the perpendicular plane of the optical axis of the auto-collimator and including the parallel light rays. Inasmuch as the two mirror gratings having their relative angular orientation measured and/or aligned are shown to be oriented at approximately 90 degrees, the angle α of beam splitter 75 should be 45 degrees. Recalling the operation of FIGURE 1, as described hereinabove, the image measuring reticle as viewed through an ocular lens will have (with respect to mirror grating 72) a line of primary and secondary image point sources impressed thereon which will have a position on the reticle commensurate with those shown in FIGURES 3a–3d depending upon the angular orientation along the three angular degrees of freedom of the mirror grating 72 with respect to the auto-collimator 74. If the angular orientation of body 70 and/or the auto-collimator is properly modified, the line display through the ocular lens may look like that shown in FIGURE 3a. Similarly, mirror grating 73 can also optically cooperate with auto-collimator 74 and produce a similar line of primary and secondary (higher order) image point sources which may be brought into registry with that produced by the other grating so that gratings 72 and 73 are aligned about the three angular degrees of freedom. Alternatively, the angular orientation of mirrors 72 and 73 may be selectively established at any given value in all three degrees of angular freedom. It should be understood that additional beam splitters may be inserted into the optical paths between the beam splitter and the bodies shown to include one or more additional bodies and associated mirror gratings to be aligned, or purposely misaligned, in a measured amount in accordance with the needs with the practical application.

Referring now to FIGURE 6, there is shown the teachings of the present invention applied to the task of synchronizing or measuring the degree of synchronization between two rotating shafts 80 and 81. To provide a mirror grating of the type described hereinabove, each of the shafts have mounted thereon a cap which has thereon alternate mirror and opaque parallel lines in the same manner as the mirror grating 15 shown in FIGURE 1. Mirror grating 82 is mounted on shaft 80; mirror grating 83 is mounted on shaft 81. Disposed between the two shaft for which synchronization is to be measured is a wedge 84 oriented, as shown, with two mirrored surfaces 85 and 86 disposed to reflect transmitted and reflected parallel light information to and from the mirror gratings as shown by the arrows. Auto-collimator 87 may be of conventional construction as described hereinabove in connection with FIGURES 1 and 5. However, the collimating lens contained therein must be large enough to pass parallel light rays transmitted to and reflected from both mirror gratings 82 and 83. The telescope portion of the auto-collimator will superimpose the rotating straight line of primary and secondary image point sources appearing on the measuring reticle of the auto-collimator from both mirror gratings 82 and 83 in registry with one another on the image measuring reticle providing that a proper two angular coordinate alignment exists between the two mirror gratings 82 and 83 and the auto-collimating system. However, if the rate of angular rotation and the amount of angular rotation between the two mirror gratings 82 and 83 are not the same, the line of primary and secondary image sources derived from each mirror grating will have a relative motion and/or a displacement as viewed through the ocular lens of the auto-collimator. While viewing the measuring reticle via the ocular lens it is important that the operator properly place his eye so as to see all of the light information which is available. The rate and degree of rotation on one of the shafts can be controlled with respect to the other so as to superimpose one line of image point sources on the other. One line of image point sources as seen through the ocular lens can be made to appear in a different color than the other line of image point sources by properly coating mirror surfaces 86 and 85 using dichroic techniques. Moreover, the synchronizing of the two shafts may be materially aided by making the point source of light of the auto-collimator of a stroboscopic type. This stroboscopic operation may be obtained by a conventional type strobing controlling system which is shown as block 88.

Figure 7A:
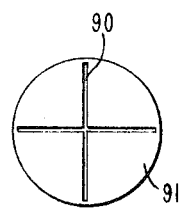
Figure 7B:
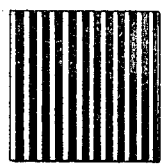
Figure 7C:
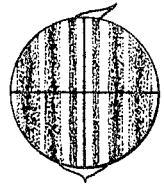

As indicated hereinabove the collimator and auto-collimator, when used in accordance with the teachings of the present invention, work satisfactorily utilizing a point source of light. However, it should be pointed out that a dark field reticle providing the light source through an opaque field having mutually perpendicular bisecting transparent slits may also be used. Referring to FIGURE 7a, there is shown such a dark field reticle with transparent slits 90 in an opaque background 91. When this type of light source is used, the display seen in the image measuring reticle through the ocular lens of the collimator or auto-collimator will have the appearance shown in FIGURES 7c, 7e and 7g. For example, referring to the system of FIGURE 1 and assuming that the alternate transparent and opaque parallel line portions of mirror grating 15 are vertical as shown in FIGURE 7b (and the mirror grating is aligned with respect to the auto-collimator about the pitch and azimuth axis), FIGURE 7c shows the display seen on the measuring reticle 30.

Because the alternate vertical opaque and mirrored line portions are vertical and the dark field reticle of the light source also has a vertical transparent slit, the diffracting image reflected back on the measuring reticle results in a display of vertical image lines of both a primary and secondary (higher order) type. The black vertical line in the image measuring reticle as shown in FIGURE 7c is the primary image while the adjacent gray slit shaded image pairs represent progressively higher order secondary images resulting from the diffraction. As shown, these secondary diffraction image pairs are symmetrical about the vertical primary image and are of increasing width and decreasing intensity. Each of the secondary gray slit image pairs are representative of plural spectrum lines. Accordingly, they will actually appear to contain lines of the various colors of the spectrum. Inasmuch as 7b shows the mirror grating with its opaque lines in the vertical orientation there will be no secondary images visible in the measuring reticle which will merely contain one horizontal white line corresponding to an image of the horizontal slit in the light source.

Figure 7D:
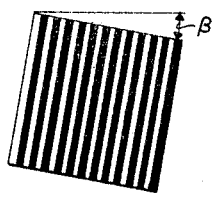
Figure 7E:
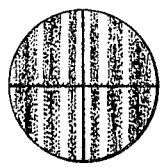

However, if the mirror grating is slightly rotated through an angle $\beta$ as shown in FIGURE 7d, the beginning of horizontal secondary images indicative of the beginning of the diffractive grating having a horizontal component will be seen in the measuring reticle as shown in FIGURE 7e. Note the fraying of the horizontal white line of FIGURE 7e. Inasmuch as the mirror grating continues to provide the same type of vertical diffraction, the vertical primary and secondary gray slit image pairs will continue to be present in the measuring reticle as shown in FIGURE 7e.

Figure 7F:
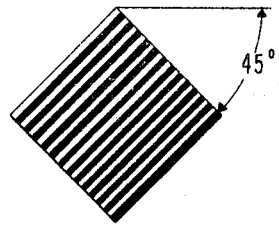
Figure 7G:
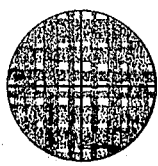

When the mirror grating has been rotated to an angle which amounts to 45 degrees as shown in FIGURE 7f, the primary and secondary slit images seen in the measuring reticle will have grown to the point that both the vertical and horizontal slit image pairs are of the same general appearance and the white lines and seconday gray slit image pairs have a symmetrical appearance about both the vertical and horizontal as that shown in FIGURE 7g. Although it cannot be shown in FIGURES 7e and 7g, as the mirror grating is rotated to a mirror angle of 45 degrees, the vertical secondary image slits will decrease in width and the horizontal image slit pairs in the reticle will expand in width. When the mirror grating is at 45 degrees of rotation the horizontal and vertical image slits are the same width and have equal separation distances. As the mirror grating is rotated to a 90 degree angle the vertical image slits will be reduced to a single white line. The same type of analysis would be applicable as the mirror grating is continued to be rotated through 90 degrees to 180 degrees, etc. Accordingly, the use of an optical grating with a collimator where the light source is mutually perpendicular bisecting transparent slits will provide an indication of the angle orientation of the optical grating about the optical axis of the collimator. While the image seen on the measuring reticle under these conditions may not be as readily analyzable as when the collimator was using a point source of light as in the embodiments hereinabove described, the image lines from both primary and secondary (higher order) diffraction images of FIGURES 7a–7g may have superior operating characteristics in certain applications such as when the readout from the telescope or ocular lens is being sensed automatically through the use of photoelectric and electronic systems.

While parallel alternately opaque line portions have been shown on the optical grating in the embodiments of the present invention described hereinabove, certain variations of this construction may be made without departing from the broad teachings which have been described. For example, the optical grating has been shown as constructed of alternately transparent and opaque parallel line portions where the transparent portions should be as transparent as practicable and the opaque portions should be as nontransparent as practicable. It should be understood that the diffraction necessary to practice the invention may be obtained by an optical grating wherein the variation of transparency may be gradations therebetween. It is only necessary that the alternate parallel portions be of a varying degree of transparency. For example, the variation of transparency in a direction perpendicular to the alternate parallel line portion may, in fact, be selected to have a particular functional distribution such as that of a sine wave. In any event, however, the degree of transparency in the direction of the parallel line portioins shown must be relatively constant. Moreover, while a relatively large number of parallel alternately opaque and transparent line portions have been described, it is reasonable to presume that the number of lines will vary with each practical application. It is reasonable to assume that when fewer parallel alternate transparent and non-transparent line portions are used there will be a degrading of performance and the generation of an effective diffraction pattern. It is clear, however, that the teachings of the present invention require the use of an optical grating which would generate a diffraction pattern including the general type which would be obtained from parallel alternately relatively transparent and relatively opaque line portions.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Optical apparatus for indicating the roll angular orientation of a movable body comprising:
   (a) a collimator device having a collimating object lens and a reticle in optical alignment with the optical axis of said lens,
   (b) said reticle being located at the focal point of said object lens for displaying images transmitted thereto by said object lens;
   (c) means operable with said collimator lens for producing a line image on said reticle for indicating the roll angular orientation of a body having its roll axis in optical alignment with said object lens comprising,
   (d) a diffraction grating fixedly attached to said body so as to be optically aligned with said collimating object lens,
   (e) said diffraction grating having a plurality of parallel straight line diffraction rulings,
   (f) said rulings having a predetermined co-ordinate orientation when mounted on said body,
   (g) parallel beam light source for producing a diffraction pattern from said diffraction grating for transmission by said object lens to said reticle,
   (h) reference mark means associated with said reticle for indicating a predetermined angular co-ordinate; and
   (i) means for simultaneously viewing said reference mark means and said line image produced by said diffraction grating and object lens on said reticle for determining the roll angular orientation of said body.

2. An optical apparatus in accordance with claim 1 in which said collimator device is an autocollimator having:
   (a) a light source for producing a parallel light beam emanating outwardly from said collimating object lens along the optical axis thereof, and
   (b) said diffraction grating comprises a planar mirror having plural nonreflective parallel straight line rulings.

3. An optical apparatus in accordance with claim 1 in which:
   (a) said light source is mounted on said body with said diffraction grating,
   (b) said diffraction grating having parallel transparent and opaque straight lines, and
   (c) said diffraction grating being a transmissive diffraction grating interposed between said light source and said collimating object lens.

4. An optical apparatus in accordance with claim 3 in which:
   (a) said parallel beam light source comprises a substantially point light source and a second collimating lens in optical alignment with said diffraction grating.

5. An optical apparatus in accordance with claim 1 in which:
   (a) said light source further includes a dark field reticle interposed between a lighting element and said diffraction grating,
   (b) said dark field reticle having two mutually perpendicular bisecting transparent slits.

6. An optical apparatus for measuring the angular orientation of a movable body having three defined body axes, roll, pitch, and azimuth comprising:
   (a) a collimator device comprising a collimating object lens having an optical axis aligned with the roll axis of said body,
   (b) a reticle means located at the focal point of said object lens,
   (c) means operable with said collimating object lens for producing a line image pattern on said reticle for depicting the angular orientation of said body relative to all three of said axes comprising a diffraction grating fixedly attached to said body so as to be optically aligned with said collimating object lens,
   (d) said diffraction grating having a plurality of straight line diffraction rulings,
   (e) said rulings having a predetermined co-ordinate orientation relative to said three axes when mounted on said body,
   (f) a parallel beam light source for producing a diffraction light pattern from said diffraction grating for transmission by said object lens to said reticle,
   (g) a reference mark means associated with said reticle for indicating a predetermined angular co-ordinate for said axes,
   (h) scale means associated with said reticle and said reference mark means for indicating the angular orientation of said body relative to each of said axes, and
   (i) means for simultaneously viewing said reference mark, said scale means, and said line image on said reticle produced by said diffraction grating and said collimating object lens for determining the pitch, azimuth, and roll orientation of said body.

7. Optical apparatus for measuring the angular orientation of a plurality of movable bodies each having three defined body axes, roll, pitch, and azimuth comprising:
   (a) a collimator device comprising a collimator object lens having an optical axis aligned with the roll axis of each of said bodies;
(b) a reticle means located at the focal point of said object lens;
(c) means operable with said collimating object lens for producing line image patterns on said reticle for depicting the angular orientation of each of said bodies relative to all three of said axes comprising a diffraction grating fixedly attached to each said body so as to be optically aligned with said collimating object lens;
(d) said diffraction gratings having a plurality of straight line diffraction rulings;
(e) said rulings having a predetermined coordinate orientation relative to said three axes of each body when mounted thereon;
(f) a parallel beam light source;
(g) means for directing said parallel beam light source to said diffraction gratings for producing diffraction light patterns therefrom;
(h) beam splitting means in optical alignment with said collimating object lens and each said diffraction grating for simultaneously transmitting diffraction patterns therefrom to said reticle;
(i) a reference mark means associated with said reticle for indicating a predetermined angular coordinate for said axes;
(j) scale means associated with said reticle and said reference mark means for indicating the angular orientation of said bodies relative to each of said axes; and
(k) means for simultaneously viewing said reference mark and said plural line images produced by said diffraction gratings and said collimating lens for determining the relative angular orientation of said bodies.

References Cited by the Examiner

UNITED STATES PATENTS

| | | | |
|---|---|---|---|
| 2,880,644 | 4/1959 | Brockway et al. | 88—14 |
| 3,107,168 | 10/1963 | Hogan et al. | 88—14 |

FOREIGN PATENTS 862,290   3/1961   Great Britain.

JEWELL H. PEDERSEN, *Primary Examiner.*

D. R. STEVENS, *Assistant Examiner.*